J. H. HAYWARD & H. S. ATKINSON.
BUCKET.
APPLICATION FILED MAR. 2, 1912.
1,180,394.                                  Patented Apr. 25, 1916.
6 SHEETS—SHEET 6.
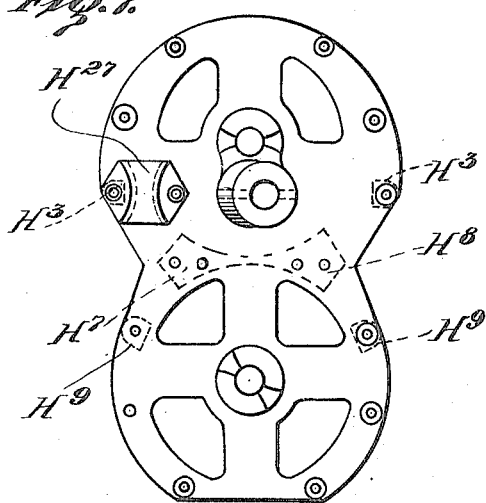
Fig. 7.
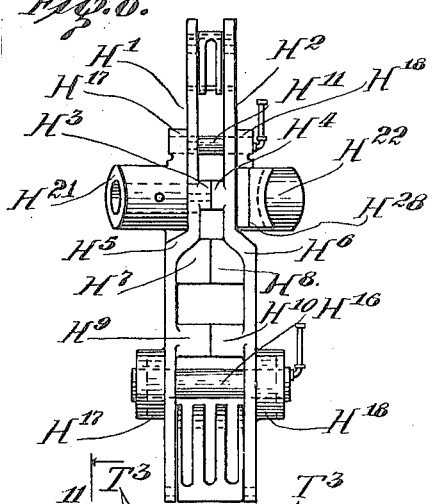
Fig. 8.
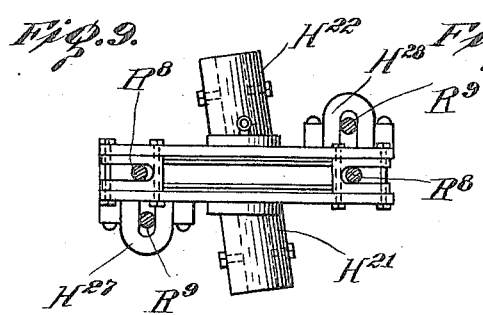
Fig. 9.  Fig. 10.
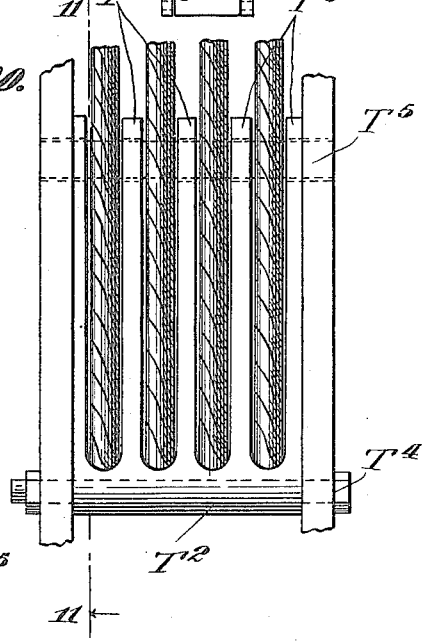
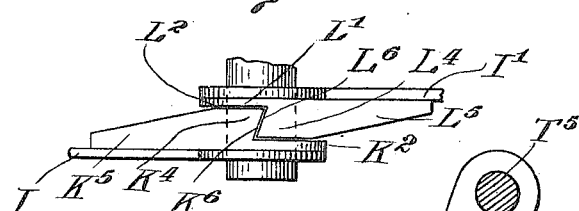
Fig. 12.
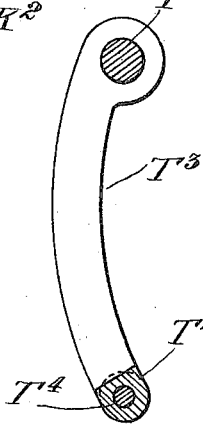
Fig. 11.
Witnesses:
C. S. Ashley
J. J. Donohue
Inventors
John H. Hayward
Herbert S. Atkinson
By their Attorneys
Macdonald & Macdonald

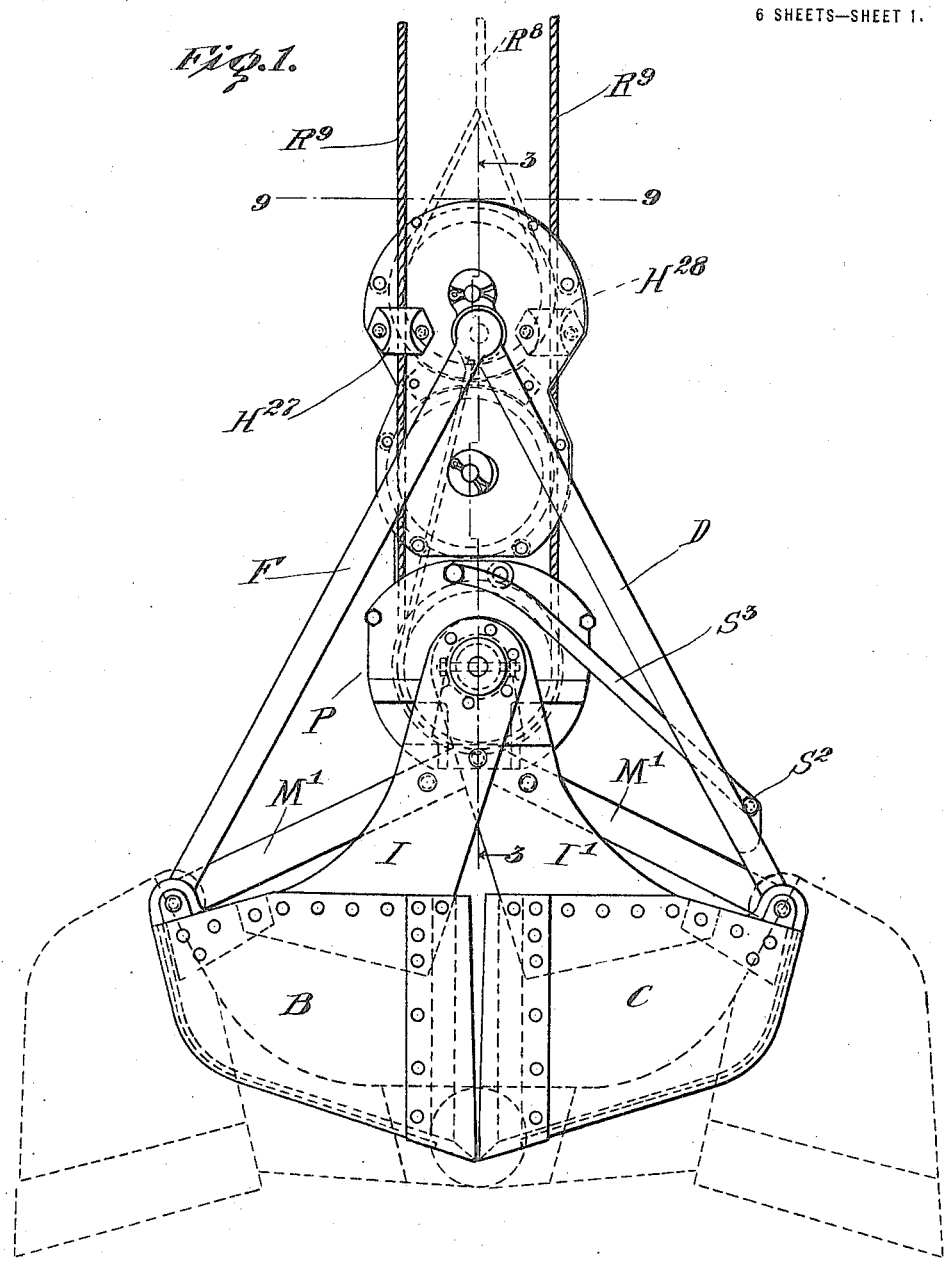

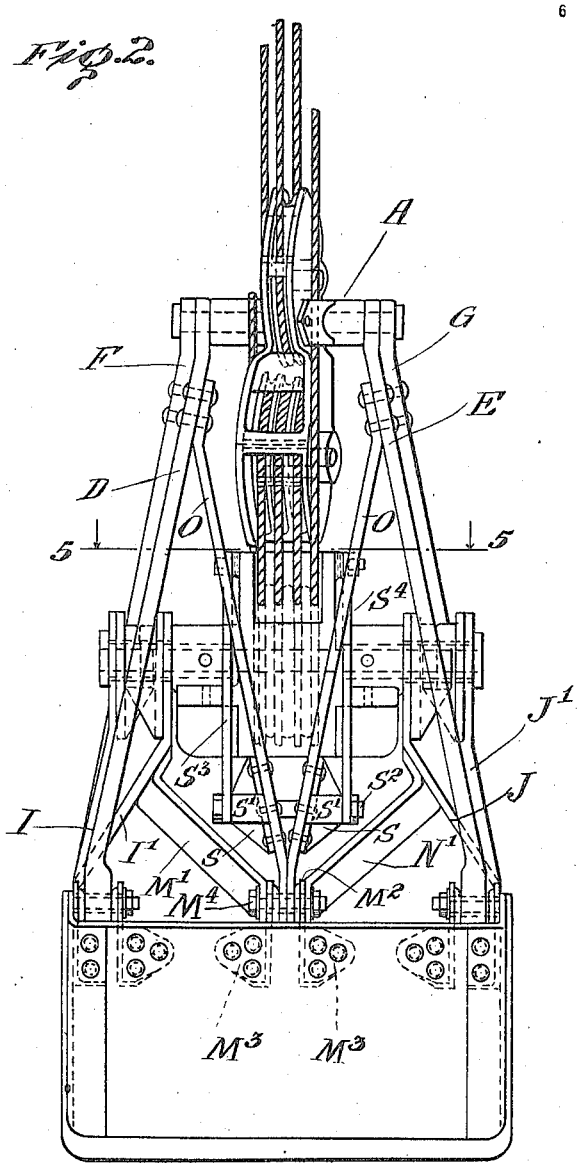

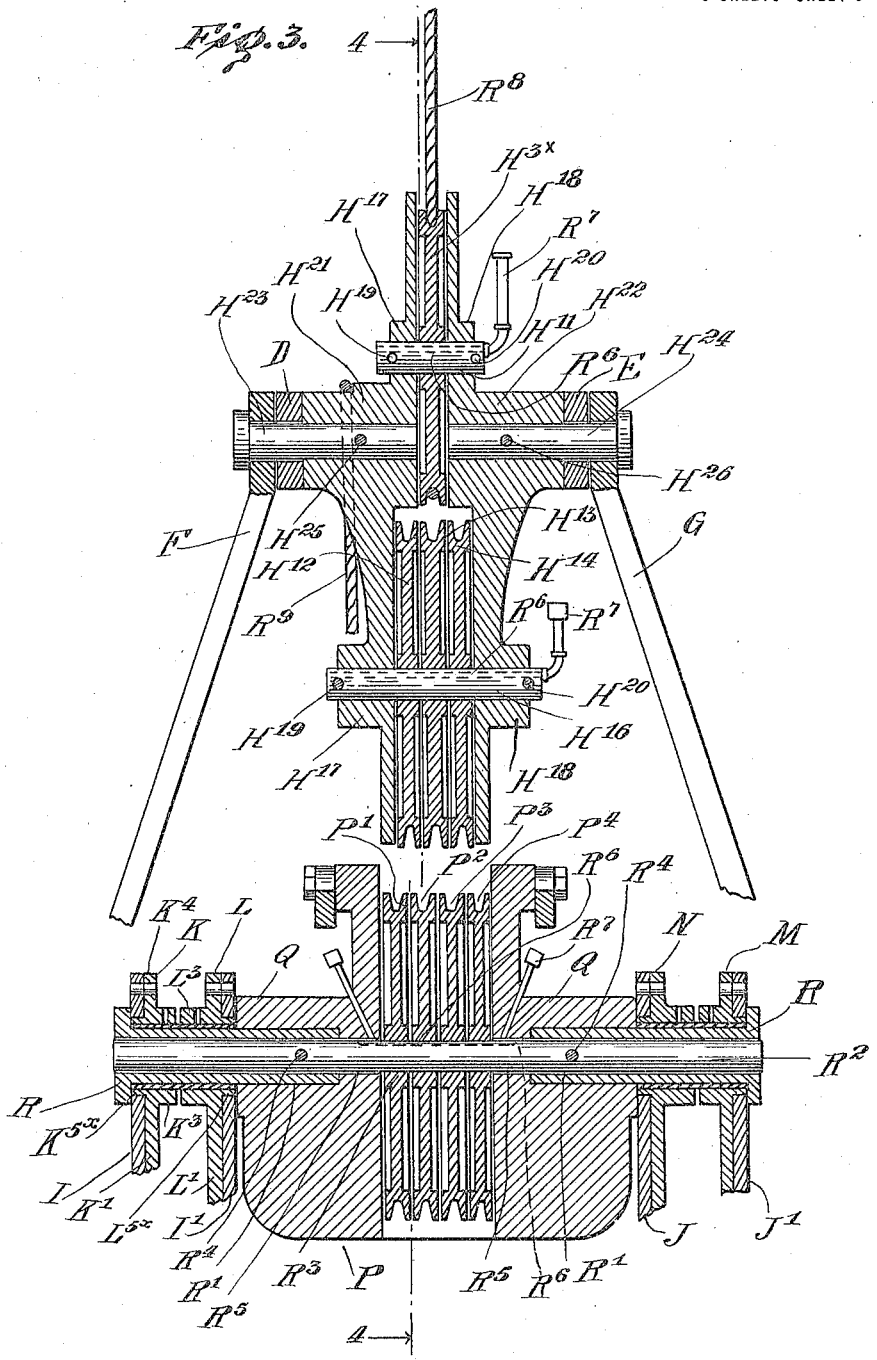

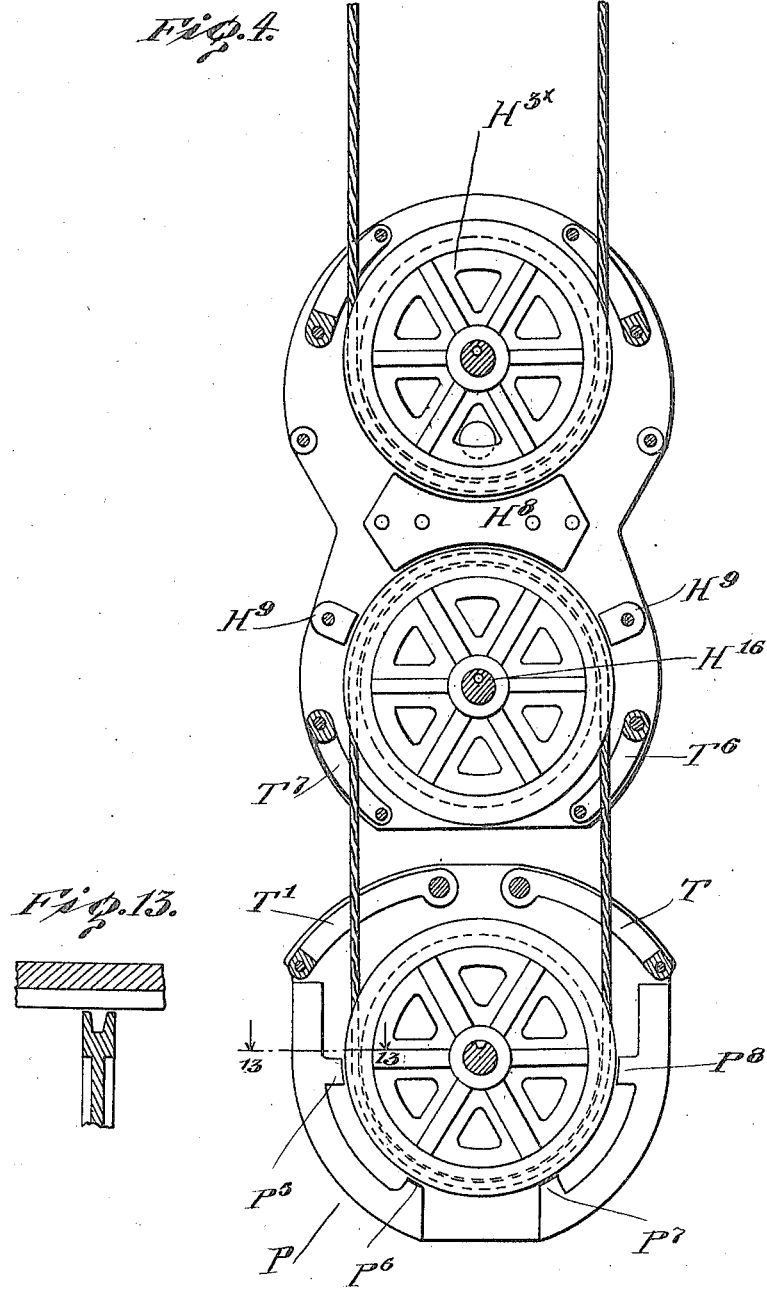

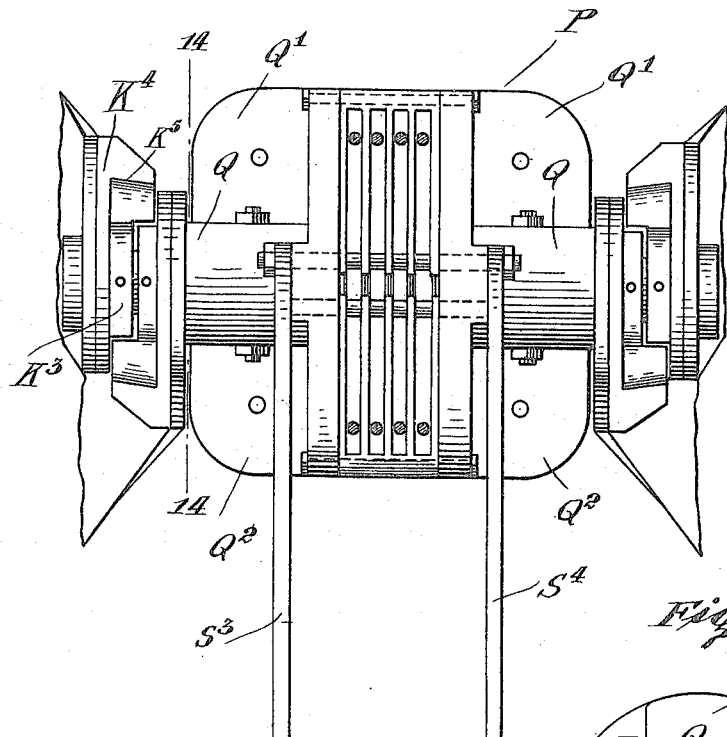

UNITED STATES PATENT OFFICE.

JOHN H. HAYWARD, OF TEANECK, AND HERBERT S. ATKINSON, OF EAST ORANGE, NEW JERSEY, ASSIGNORS TO THE HAYWARD COMPANY, OF NEW YORK, N. Y., A CORPORATION OF NEW YORK.

BUCKET.

1,180,394.

Specification of Letters Patent.

Patented Apr. 25, 1916.

Application filed March 2, 1912. Serial No. 681,197.

*To all whom it may concern:*

Be it known that we, JOHN H. HAYWARD, a citizen of the United States, and residing at Teaneck, in the county of Bergen and State of New Jersey, and HERBERT S. ATKINSON, a citizen of the United States, and residing at East Orange, in the county of Essex and State of New Jersey, have invented certain new and useful Improvements in Buckets, of which the following is a full, clear, and exact specification, such as will enable others skilled in the art to which it appertains to make and use the same.

This invention relates to hoisting buckets and particularly to those known in the trade as the clam shell bucket.

One of the objects of our invention is to provide a sheave-operated bucket, the upper center of which employs a pivotally mounted head, the coöperating parts of which are so arranged as to give flexibility to the head, within certain limits, whereby the bucket is better adapted to take different positions upon the material to be excavated than in the case of buckets otherwise constructed.

A further object of our invention is to provide a sheave-operated bucket of the character stated, which may be operated either in the bights of the lines, from a carrier or trolley, in connection with cantaliver or other bridge or tower structures, or at the end of said lines, in connection with an ordinary boom derrick.

Another object of our invention is to provide simple and reliable mechanism whereby the sheave casing in the lower center is prevented from undue turning movement, while offering substantially no frictional resistance to its perpendicular movements.

A further object of our invention is to provide, in connection with said bucket, new and improved means for guiding the ropes in the respective sheave casings.

A further object of our invention is to provide new and improved means for limiting the opening movement of the bucket which means also operates to prevent lateral movement or displacement of the bowl sections.

A further object of our invention is to provide means whereby the digging power of the bucket may be readily and quickly varied to meet varying conditions, depending upon the quality of material to be excavated.

A further object of our invention is to provide a durable bucket, which is economical to manufacture and which may be readily assembled and taken apart, the construction being such that new parts may be easily and quickly substituted without dismantling the entire structure.

The afore-mentioned objects, as well as the construction and operation of the bucket, will be made clear by the following description in connection with the accompanying drawings, in which,—

Figure 1 is a side elevation; Fig. 2 is an end elevation; Fig. 3 is a vertical section on line 3—3 of Fig. 1; with certain parts broken away and certain other parts removed; Fig. 4 is a vertical section on line 4—4 of Fig. 3 the most of the parts being shown in elevation; Fig. 5 is a plan view of the lower center of the bucket on line 5—5 of Fig. 2, in the direction of the arrows, with parts broken away; Fig. 6 is a view of the lower part of the upper sheave casing on line 5—5 of Fig. 2 in a direction opposite to that indicated by the arrows; Fig. 7 is an enlarged detail; Fig. 8 is an end elevation of the part shown in Fig. 7; Fig. 9 is a plan view on line 9—9 of Fig. 1; Fig. 10 is an enlarged detail of one of the rope guides; Fig. 11 is a section on line 11—11 of Fig. 10; Fig. 12 is a plan detail; Fig. 13 is a horizontal section on line 13—13 of Fig. 4; Fig. 14 is a vertical section on line 14—14 of Fig. 5, with a part added; Fig. 15 is a plan view of some of the parts shown in Fig. 14; and, Fig. 16 is a side elevation of one of the blade arm bearings.

Referring to the construction illustrated, the bucket comprises a supporting head indicated in whole at A, a plurality of bowl sections, each indicated in whole at B, C, which are suspended and supported from the head A by a plurality of connecting rods D, E, F, G.

The head A is preferably formed as a two-part casting the parts of which, when secured together, as hereinafter described, act not only as means for securing the parts of the bucket, at its upper center, together, but also form a casing for some of the operating sheaves of the bucket. As will be more clearly seen by a reference to Figs. 1, 2, 3, 4, 7, 8, and 9, and with particular rference to the last three figures mentioned, said head casting comprises the side plates $H'$, $H^2$, which are respectively formed on their inner surfaces with inwardly projecting lugs $H^3$, $H^4$, said lugs acting to space apart the side plates $H'$, $H^2$ and also as bearing bosses for the reception of bolts for securing the parts together. At a point midway the vertical length thereof the side plates are offset as indicated at $H^5$, $H^6$, and the inner face of each of said side plates is further provided with an inwardly extending lug, indicated at $H^7$, $H^8$, having the form shown in dotted lines in Fig. 7, which meet to form a rope guard for the sheaves in said casing, as more clearly indicated in Fig. 4. They also act as spacers for the side plates and as bearing bosses to receive bolts to assist in holding the side plates firmly together. Other spacing lugs and rope guards $H^9$, $H^{10}$, are placed at opposite ends of each of the side plates $H'$, $H^2$. It will be observed that the spaced apart relation of the side plates $H'$, $H^2$, provides a housing, in the upper portion of the head casting, for a holding line sheave $H^{8x}$, which is rotatably mounted upon the sheave pin $H^{11}$, and a considerably wider housing, in the lower portion of the casting, for a plurality of closing line sheaves indicated (Fig. 3) at $H^{12}$, $H^{13}$, $H^{14}$, which are rotatably mounted upon a common sheave pin $H^{16}$. The sheave pins $H^{11}$, $H^{16}$, pass through bosses $H^{17}$, $H^{18}$, and are secured in position against turning movement by cotter pins $H^{19}$, $H^{20}$. Each of the side plates $H'$ $H^2$, has formed thereon, and preferably integral therewith, a lateral hub member indicated at $H^{21}$, $H^{22}$, which hub members are horizontally apertured to receive headed bolts $H^{23}$, $H^{24}$, respectively, which pass through apertures in the upper ends of the connecting rods $D$, $E$, $F$, $G$, the same being secured in position by the pins $H^{25}$, $H^{26}$. It will be seen that the connecting rods are pivotally mounted at their upper ends upon the bolts $H^{23}$, $H^{24}$, and the hub members $H^{21}$, $H^{22}$, have freedom of rotative movement with said bolts relatively to said connecting rods. The vertical position of the sheave casing formed by the side plates $H'$, $H^2$, is slightly diagonal to the horizontal direction of the hub members $H^{21}$, $H^{22}$, the purpose of which is to provide for a proper lead of ropes for the operating sheaves.

The side plates $H'$, $H^2$, are provided, at diagonally opposite points, with rope thimbles indicated at $H^{27}$, $H^{28}$. It is further to be observed that the pivotal point or axis of the head A is at a point somewhat above midway the length of the side plates $H'$, $H^2$, which being above the center of gravity of said head permits the same to normally retain a vertical position (when not acted on by the holding line) even though the bucket generally may occupy a diagonal position on the material to be excavated.

The bowl members B, C, have rigidly secured thereto at each side thereof, a side arm I, I', J, J', at the upper ends of each of which are rigidly secured bearing members indicated at K, L, M, N, upon which is pivotally mounted a lower sheave casing indicated in whole at P.

The side arm bearings M, N, are similar in all respects to the side arm bearings K, L, and therefore only one set of such bearings will be described. The side arm bearing K comprises a base member $K'$, which at one end, indicated at $K^2$ is rounded off to conform to the shape of the rounded pivotal end of the side arm I, to which it is rigidly secured. Projecting laterally from the base member $K'$, is a flange member $K^3$, which extends annularly to form a hub, which hub at one side thereof has formed thereon and preferably integral therewith and likewise integral with the base member $K'$, a stop $K^4$ which is provided with a reinforcing tongue $K^5$ extending tangentially from said hub member. It will be seen by reference to Fig. 12, that the contact face $K^6$ of said stop is disposed diagonally to the axis of the bearing K, being inclined downwardly and inwardly toward the base member $K'$, when the bucket is in closed position. The base member $K'$ is also formed at the side opposite that just described with a laterally projecting annular flange $K^{5x}$ adapted to rest within the apertured end of the side arm I. The blade arm bearing L is identical in construction with that just described, comprising a base member $L'$, having a rounded end, indicated at $L^2$, conforming to the shape of the rounded pivotal end of the side arm I', to which it is rigidly secured. It has the flange or hub member $L^3$, the stop $L^4$, and the reinforcing tongue $L^5$, said stop also having the diagonally disposed face $L^6$. It also has the oppositely disposed annular flange $L^{5x}$. The side arm bearing L, when in position upon the blade arm I', being disposed oppositely to that of the bearing K, the diagonal face $L^6$ thereof is adapted, when the bucket is in open position, to meet flush with the diagonal face $K^6$ of the bearing K. The diagonal faces $K^6$, $L^6$ of the stops $K^4$, $L^4$, of the side arm bearings we regard as important features of our invention.

Each of the trays B, C, has pivotally secured thereto a plurality of side-arm brace members $M'$, $N'$, the inner ends of which are riveted or otherwise rigidly secured to the side-arms I, I', J J' and the outer ends of which are apertured and pivotally connected to the upper edge of the trays by means of the apertured ears $M^2$, forming part of the brackets $M^3$, secured to the inner side of said trays, said brace members and bracket ears being pivotally held together by means of the headed holding bolt M⁴ passing through said apertured parts. Also pivotally mounted upon the bolt M⁴ are a plurality of connecting rod braces O, which at their upper ends are rigidly secured to the connected rods D, E, F, G. The function of the side arm braces M′, N′, and the connecting rod braces O, O, is to keep the trays in alinement, a result which is also in large measure contributed to when the bucket is in open position by the diagonal faces of the stops K, L, heretofore described and best illustrated in Fig. 12, wherein it will be seen that the diagonal face K⁶ abuts against the diagonal face L⁶, causing a locking of the parts, in this position, against lateral movement of the trays, relative to each other.

In the lower center of the bucket is pivotally mounted a sheave casing indicated in whole at P, which is formed at its middle portion with an opening for the reception of a plurality of sheaves indicated at P′, P², P³, P⁴. The inner surface of said sheave casing is formed with a plurality of projections P⁵, P⁶, P⁷, P⁸, extending transversely of said opening, and each of which is formed with a curved face conforming to the curve of the periphery of the sheaves, whereby the same are adapted to act as rope guards for said sheaves. About midway the vertical plane of said sheave casing P, the same is provided, at each side thereof, with horizontally disposed lateral bosses, Q, approximately semicircular in shape, from which radiate a plurality of ribs Q′, Q², Q³, which ribs form seats and abutments for securing thereto weights Q⁴, Q⁵, Q⁶, by means of the bolts Q⁷, Q⁸, which weights may be thus added to the sheave casing in case the quality of material to be excavated varies and requires additional weight in the bucket. These weights also serve the function of adding rope overhauling power to lower center of the bucket, for it will be understood that with such buckets a considerable length of rope is frequently used, which rope is very heavy and in its passage from a hoisting drum to the bucket itself, a large amount of frictional resistance results, which must be compensated for and overcome by the heavy sheave casing in the lower center of the bucket, which, unless of sufficient weight to accomplish this, would be unable to effect the opening of the bowl sections.

The sheave casing P, is pivotally secured to the side-arms I, I′, J, J′, by means of the headed hollow side-arm pins R, R, which are inserted through side-arm bearing members K, L, M, N, and into recesses R′, in the bosses Q of the casing P. The sheaves P′, P², P³, P⁴, are supported upon the sheaves pin R², which passes through both of the hollow side-arm pins R and through the respective hubs R³ of said sheaves and are secured against longitudinal movement by means of the transverse pins R⁴, which are projected through the bosses Q and through the hollow side-arm pins R and through the sheave pin R². While the sheave pin R² is projected entirely through all of the parts mentioned this is largely for convenience in withdrawing said pin for the removal, when necessary, of one or more of the sheaves, without disarranging or dismantling the other operative parts mentioned, and a clearance way is afforded between said sheave pin and the inner walls of the side-arm pins R, so that said hollow side-arm pins do not act as bearings therefor, bearings for said sheave pin R² being provided at that part of the sheave casing directly contiguous to the sheaves themselves, the bearing points therefor being indicated more clearly at R⁵, in Fig. 3.

All of the sheave pins R², H¹⁶, H¹¹, are self oiling pins, being grooved as at R⁶, to which grooves a lubricant may be admitted from the oil cups R⁷. It will be understood that the holding line, indicated at R⁸, for supporting and raising and lowering the bucket is passed around the upper sheave indicated at H³ˣ, and it may be arranged so that the bucket may operate in the bight or loop of the line, or may be dead ended so that the bucket may operate at the end of said line. Also the closing line indicated at R⁹, may be dead ended, as indicated in Fig. 3, by securing one end of the same to the head A or other fixed point of the bucket, whereby the opening and closing movement may be effected at the end of the line, or the bucket may be opened and closed in the bight or loop of the line. It will be understood that the closing line R⁹, when dead ended at the head A as shown in Fig. 3, passes first around the lower sheave P′, then up and around the upper sheave H¹², thence down around the sheave P², up and around the sheave H¹³, thence down and around the sheave P³, thence up and around the sheave H¹⁴, thence down and around the sheave P⁴, and thence up and thorugh one of the rope thimbles H²⁷, H²⁸. When the bucket is intended to operate in the bight or loop of the line, instead of being dead ended as indicated in Fig. 3, the closing line will pass down through one of the thimbles as for example H²⁷, thence down and around the sheaves as just described and out through the other rope thimble, as at H²⁸.

In order to limit the opening movement of the trays of the bucket, the hinge stops K⁴, L⁴, are provided. In a bucket thus constructed with tray operating sheaves there will necessarily be some turning movement of the lower sheave casing as it is raised and lowered to close and open the bucket unless some provision is made to obviate the same. Other buckets heretofore constructed have provided means for this purpose, which have been more or less satisfactory, but have embodied features which, especially where the bucket was subjected to rough usage, have proved objectionable, and which it is our purpose to avoid by the means herein illustrated, and which we will now describe.

Rigidly mounted upon the connecting rod cross braces O are a plurality of bearing pieces S, which are provided with rounded laterally projecting bosses S', apertured longitudinally and through which is projected and rotatably secured in position, a holding bolt $S^2$, upon which bolt are pivotally mounted, one at each end thereof, control rods $S^3$, $S^4$, which, at their opposite ends are pivotally secured to the lower sheave casing near its upper portion, and at a point slightly outside the axial line of said casing.

It might appear from a first glance at the structure shown in Fig. 1, that although the inner ends of the control rods are pivotally connected to the sheave casing, at points outside the axial line of said casing, it would not permit of the free vertical movement of the sheave casing P. It is to be borne in mind, however, that the outer ends of the control arm are not connected to an immovable part of the bucket, but are connected to the connecting rod braces, the lower ends of which are free to move outwardly and inwardly, relatively to the sheave casing as the bucket is opened and closed respectively. This feature of connecting the control arms to a member movable relatively to the sheave casing is an important feature of this part of our invention, for this movement makes possible pivotally mounting the control arms upon the sheave casing to retain said casing in an approximately horizontal position, while not interfering in the slightest degree with its perpendicular movement. The hereinbefore referred to stops $K^4$, $L^4$, have a direct effect on the operation of these control arms. Said stops act not only to limit the opening movement of the bowl sections, and thereby the lowering of the sheave casing, but also the length of travel of the control arms pivoted to said casing. It will be evident that if such opening movement of the bowl sections were continued beyond the required predetermined point, the continued arcing travel of the pivoted ends of the control arms would turn the casing so far on the reverse side of the casing axis to that illustrated, that on the closing movement of the bowl sections the casing would turn completely over and jam and prevent the closing of the bucket sections.

The lower sheave casing P is provided with rope guards embodying novel as well as economical features of construction. In this casing two of these rope guards are employed as indicated at T, T' (see Fig. 4) and as both are identical we will describe but one. It comprises a comb-like casting having the trunk member $T^2$ from which project the curved guard fingers $T^3$. The trunk member $T^2$ is apertured, likewise the ends of the guard fingers $T^3$ to receive respectively the bolts $T^4$, $T^5$, whereby said guards are secured to the sides of the casing. The bolt $T^5$ also acts as a removable connector or closing member for the free ends of the guide arms, and serve, at that end of the guide, to retain the parts of the rope in their proper places therein. Similar rope guards $T^6$, $T^7$ are also employed in the lower portion of the upper sheave casing. It will be seen that as both the upper and lower sheave casings are pivotally mounted, and as both are capable of limited rotary movement, such rope guards have a special utility in connection therewith, since they are adapted to accommodate the passes or parts of the rope in the different pivotal positions assumed by the respective sheave casings. The peculiar construction of these rope guards also facilitates their ready removal from the sheave casing, when worn out, and from the passes or parts of the rope which they guard, since all that is necessary, on such removal, is to remove the bolts at each end of the guard, whereupon the guards may be lifted away from the ropes and casings. This is a feature of importance when it is considered that such buckets often require, for their operation, hundreds of feet of rope, and it is therefore much easier to remove the guard from the rope than to remove the rope from the guard.

The operation of the bucket will be quite clear from the foregoing description, in connection with the accompanying drawings. It will be understood that the bucket is opened by holding taut the holding line and loosening the closing line, thereby lowering the lower sheave casing, permitting it to fall by gravity, when the bowl sections take the position indicated in dotted lines in Fig. 1, the opposing stops shown in Figs. 12 and 16 meeting at the end of, and limiting, the opening movement. In this open position of the bowl sections, the holding-line is paid out to drop the bucket onto the material to be excavated or lifted. In dropping the bucket onto the material, the surface of which may be very uneven, it often assumes a digging position out of the perpendicular so that one end of the bucket may be considerably higher than the other. In coming to this position, owing to the pivotal mounting of the head of our bucket, the upper sheave casing is permitted to swing and take a position in response to the direction of pull on the holding line diagonal to the normal vertical plane of the bucket but as the point of leverage is below the axis of the head, the closing line sheaves in said casing, respond immediately when said line is actuated and tend to take a position in a direct line with the pull of the sheaves in the lower center, during which operation of course the holding-line is eased off somewhat to permit the bucket to sink into the material.

In closing the bucket, the closing line is hauled in and the lower sheave casing raised toward the upper center of the bucket, thereby bringing the blades of the bowl sections together, and in this position both the holding line and the closing line are actuated to hoist the bucket.

We desire it to be understood that we do not confine ourselves to the precise details of construction and arrangement of the invention herein set forth, as modifications and variations may be made without departing from the spirit of the invention, as defined by the appended claims.

What we claim is:

1. In a bucket the combination with a supporting head of a plurality of bowl sections, a sheave casing to which said sections are pivotally connected, connecting rods pivotally connected to the head and to said bowl sections, sheaves in said casing and means pivotally connected to said casing and to another bucket element for retaining the casing in an approximately horizontal position as said casing is vertically moved to open and close the bucket.

2. In a bucket the combination with a supporting head of a plurality of bowl sections, a sheave casing to which said sections are pivotally connected, connecting rods pivotally connected to the head and to said bowl sections, sheaves in said casing and means pivotally connected to said casing and pivotally connected to a movable part of said bucket to retain said casing in a substantially horizontal position as it is vertically moved to open and close the bucket.

3. In a bucket, the combination with a supporting head, of a plurality of bowl sections, a sheave casing to which said sections are pivotally connected, connecting rods pivotally connected to the head and to said bowl sections, sheaves in said casing, and a link having operative connection with said casing and with an oscillating bucket member to prevent the turning of said casing from an approximately horizontal position as it is vertically moved to open and close the bucket.

4. In a bucket the combination with a supporting head, of a plurality of bowl sections, a sheave casing to which said sections are pivotally connected, connecting rods pivotally connected to the head and to said bowl sections, sheaves in said casing and means for preventing undue turning movement of said casing as the same is moved vertically to open and close the bucket, said means comprising an oscillating arm connected to a movable member.

5. In a bucket the combination with a supporting head, of a plurality of bowl sections, a sheave casing to which said sections are pivotally connected, connecting rods pivotally connected to the head and to said bowl sections, sheaves in said casing, and means for preventing undue turning movement of said casing as the same is moved vertically to open and close the bucket, said means comprising an oscillating arm connected to said casing and to an oscillating part of the bucket.

6. In a bucket the combination with a supporting head, of a plurality of bowl sections, a sheave casing to which said sections are pivotally connected, connecting rods pivotally connected to the head and to said bowl sections, sheaves in said casing means for preventing undue turning movement of said casing as the same is moved vertically to open and close the bucket, said means comprising a plurality of oscillating arms pivotally connected to an oscillating part of the bucket and means acting to limit the opening movement of the bowl sections and the lowering travel of said arms.

7. In a bucket the combination with a supporting head, of a plurality of bowl sections, side-arms connected to the bowl sections, a sheave casing pivotally connected to said side-arms and means for limiting the opening movement of the bucket, comprising a plurality of bearing members on said side arms, a plurality of hinge stops on said bearing members, said stops being provided with contact faces diagonally oppositely disposed relative to the axis of said sheave casing, to prevent lateral motion of the bowl sections.

8. In a bucket the combination of a bucket head, a plurality of bowl sections pivotally suspended from the bucket head, side arms on said bowl sections, a sheave casing pivotally secured to said side arms, said casing having longitudinally extending recesses therein, a plurality of hollow side-arm pins projecting through said side arms and into said recesses, a plurality of sheaves in said casing, and a sheave pin extending through said hollow side-arm pins and through said sheaves.

9. In a bucket the combination of a bucket head, a plurality of bowl sections pivotally suspended from the bucket head, side arms on said bowl sections, a sheave casing pivotally secured to said side-arms, said casing having longitudinally extending recesses therein, a plurality of hollow side-arm pins projecting through said side arms and into said recesses, a plurality of sheaves in said casing, and a sheave pin extending through said hollow side-arm pins and through said sheaves and means for retaining said side-arm pins in position.

10. In a bucket, the combination of a supporting head, bowl sections pivotally suspended from said head, a sheave casing pivotally supported upon the bowl sections, closing line sheaves in said casing and in said head, a line reeved about said sheaves and adapted to close said bowl sections, and a rope guide for said line secured to said casing comprising a trunk member, a plurality of arms projecting from said trunk member, and means connecting the free ends of said arms.

11. In a bucket, the combination of a supporting head including a sheave casing, bowl sections pivotally suspended from said head, a second sheave casing pivotally supported upon the bowl sections, sheaves in said respective casings, a closing line extended around the sheaves in said casings, and rope guiding means for said line, comprising a trunk member, a plurality of curved arms projecting from said trunk member and a removable connecting and closing member for the free ends of said arms.

12. In a bucket, the combination of a supporting head, bowl sections pivotally suspended from said head, said head including a sheave casing adapted to take different pivotal positions, a second sheave casing connected to the bowl sections and adapted to take different pivotal positions, sheaves in the respective casings, a closing line passing around the sheaves in the respective casings and adapted to close said bowl sections, means on said casings for freely guiding the parts of said line into said sheaves in the different pivotal positions assumed by said casings, said guiding means comprising a trunk member and a plurality of curved arms projecting from said trunk member, and means for securing said member and said arms to the casing.

13. In a bucket, the combination with a supporting head of a plurality of bowl sections, a sheave casing to which said sections are pivotally connected, connecting rods pivotally connected to the head and to said bowl sections, sheaves in said casing, means pivotally connected to said casing and pivotally connected to a movable part of said bucket to retain said casing in an approximately horizontal position as it is vertically moved to open and close the bucket and means limiting the opening movement of the bowl sections and the lowering movement of said retaining means.

14. In a bucket the combination with a plurality of bowl sections, a supporting head adapted to form upper and lower sheave compartments, connecting rods connected to said bowl sections, means for supporting said rods upon said head, a holding line sheave in the upper one of said compartments, a plurality of closing line sheaves in the lower one of said compartments, side arms rigidly connected to said bowl sections, a sheave casing pivotally mounted on said side arms, a plurality of closing line sheaves in said casing, oscillating means connected to said casing and to another bucket element for retaining the casing in an approximately horizontal position as said casing is vertically moved to open and close the bowl sections and means for limiting the lowering movement of said casing and of said oscillating means.

15. In a bucket the combination with a plurality of bowl sections, a supporting head adapted to form upper and lower sheave compartments, connecting rods connected to said bowl sections, means for pivotally supporting said rods upon said head, a holding line sheave in the upper one of said compartments, a plurality of closing line sheaves in the lower one of said compartments side arms rigidly connected to said bowl sections, a sheave casing pivotally mounted on said side arms, a plurality of closing line sheaves in said casing, and means pivotally connected to said casing and to an oscillating member for retaining said casing in an approximately horizontal position as said casing is moved to open and close the bowl sections.

16. In a bucket the combination with a plurality of bowl sections, a supporting head adapted to form upper and lower sheave compartments, connecting rods connected to said bowl sections, means for pivotally supporting said rods upon said head, a holding line sheave in the upper one of said compartments, a plurality of closing line sheaves in the lower one of said compartments, side arms rigidly connected to said bowl sections, a sheave casing pivotally mounted on said side arms, a plurality of closing line sheaves in said casing, a control arm movably mounted upon said casing and movably mounted upon a movable member to control said casing in its vertical movements on the opening and closing of the bucket and means acting to limit the lowering of said casing, the opening of the bowl sections and the lowering travel of said control arm 17. In a bucket, the combination with a supporting head of a plurality of bowl sections, a casing connected to said bowl sections, supporting means pivotally connecting said head and said bowl sections, a power device in said casing, and means having operative connection with said casing and controlled by said supporting means for retaining said casing in an approximately horizontal position during its operating movements.

18. In a bucket, the combination of a supporting head, a plurality of bowl sections, a sheave casing pivotally connected to said bowl sections oscillating members having operative connection with said head and with said bowl sections, sheaves in said casing, and means connected to said casing having operative connection with certain of said members and controlled thereby, for retaining said casing in proper horizontal position as it is vertically moved to open and close the bowl sections.

19. In a bucket, the combination of a supporting head, a plurality of bowl sections, a sheave casing connected to said bowl sections, connecting rods carried by said head and connected to said bowl sections, sheaves in said casing, and means connected to said casing and controlled by the movement of certain of said connecting rods, for retaining said casing in an approximately horizontal position as it is vertically raised and lowered to close and open the bowl sections.

20. In a bucket, the combination of a supporting head, a plurality of bowl sections, a casing pivotally connected to said bowl sections, oscillating connecting rods carried by said head and connected to said bowl sections, a power device in said casing, supporting means connected to and movable with the oscillating movements of certain of said connecting rods, and a control member having operative connection with said casing and with said supporting means for retaining said casing in an approximately horizontal position as it is vertically moved to operate the bowl sections.

21. In a bucket, the combination of a supporting head, a plurality of bowl sections, a sheave casing connected to said bowl sections, pivoted supporting means operatively connected to said head and to one of said bowl sections and movable relatively to the latter, and a control member having operative connection with and controlled by said pivoted means and also having operative connection with said casing, for retaining said casing in an approximately horizontal position as it is vertically moved to open and close the bowl sections.

22. In a bucket, the combination with a supporting head of a plurality of bowl sections, a casing connected to said bowl sections, supporting means pivotally connecting said head and said bowl sections, winding means in said casing, and means connected to said casing and controlled by said supporting means for retaining said casing in an approximately horizontal position during its operating movements.

23. In a bucket, the combination of a supporting head, a plurality of bowl sections, a casing pivotally connected to said bowl sections, oscillating connecting rods carried by said head and connected to said bowl sections, winding means in said casing, supporting means connected to and movable with the oscillating movements of certain of said connecting rods, and a control member having connection with said casing and with said supporting means for retaining said casing in an approximately horizontal position as it is vertically moved to operate the bowl sections.

24. In a bucket the combination of a plurality of bowl sections, connecting rods pivotally connected to said bowl sections and a sheave casing pivotally supporting said connecting rods comprising a plurality of perpendicularly disposed castings rigidly secured together, said castings being provided on their inner surfaces with integral spacing lugs having arc-shaped surfaces adapted to form rope guards.

JOHN H. HAYWARD.
HERBERT S. ATKINSON.

Witnesses:
LAURA E. SMITH,
JOHN M. BITTNER.

Copies of this patent may be obtained for five cents each, by addressing the "Commissioner of Patents. Washington, D. C."